Aug. 5, 1969     C. B. WHITE     3,460,153

SENSING AND RECORDING GAS CONCENTRATION

Filed Feb. 14, 1968     4 Sheets-Sheet 1

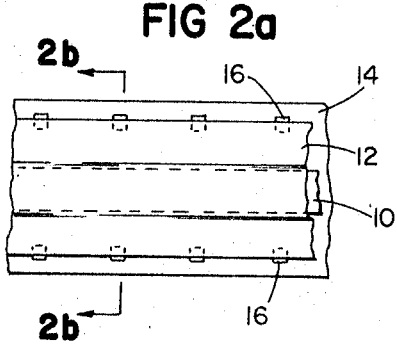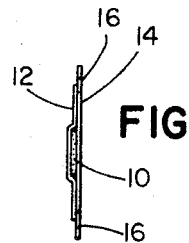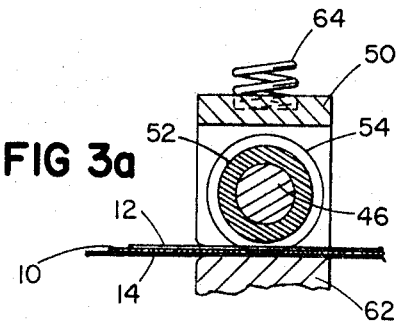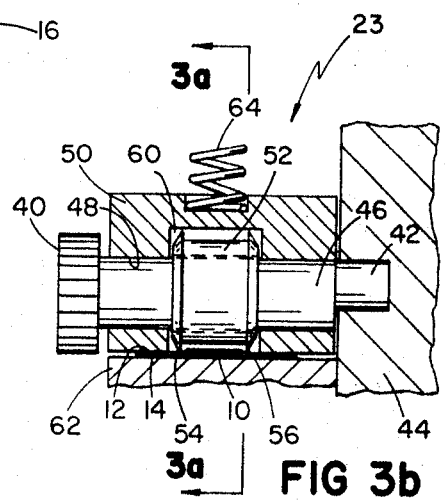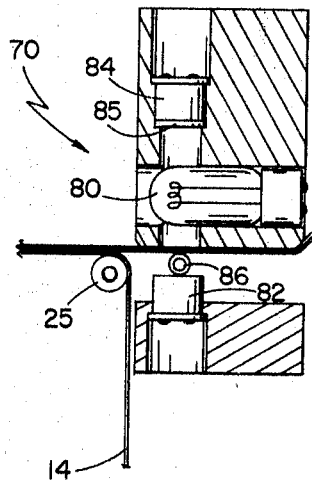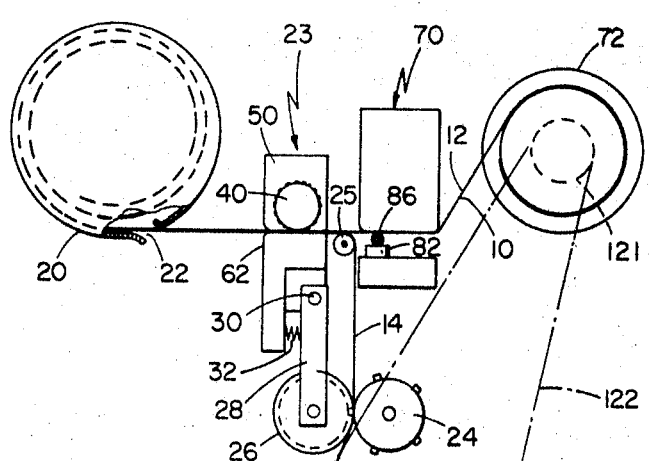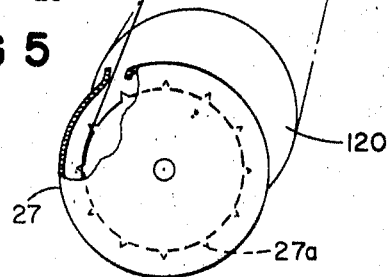

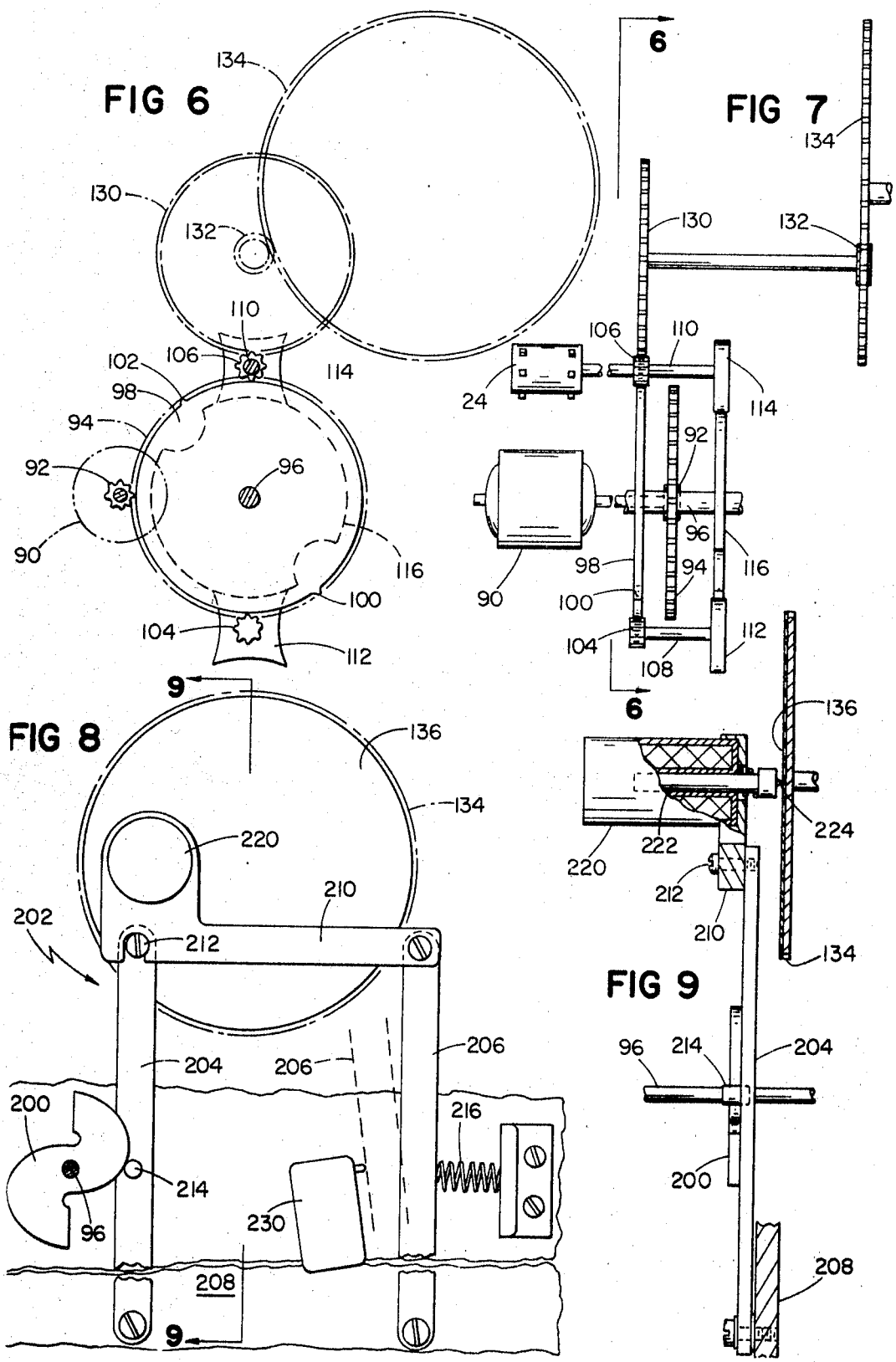

Aug. 5, 1969  C. B. WHITE  3,460,153
SENSING AND RECORDING GAS CONCENTRATION
Filed Feb. 14, 1968  4 Sheets-Sheet 4

United States Patent Office 3,460,153
Patented Aug. 5, 1969

3,460,153
SENSING AND RECORDING GAS
CONCENTRATION
Carl B. White, Hamden, Conn., assignor to Union Industrial Equipment Corporation, Fall River, Mass., a corporation of Massachusetts
Filed Feb. 14, 1968, Ser. No. 705,380
Int. Cl. G01d 9/38
U.S. Cl. 346—33                                   15 Claims

ABSTRACT OF THE DISCLOSURE

Gas concentration is sensed and recorded by advancing charges of a color changing material to an optical sensor, exposing the charges to gaseous samples, and recording gas concentration through a device that reflects the length of time required for the charges to undergo a certain amount of color change in response to the exposure to the gaseous samples. The charges are sealed in a laminated tape, and a device is provided to separate the laminations to expose only the charge about to be advanced to the sensor.

---

This invention relates to gas monitors.

Objects of the invention are to provide for accurate, reproducible exposure of a succession of gas sensitive charges to a succession of gaseous samples and sensing of gas content in said samples, as well as accurate, reproducible recording of the gas content, with a device operable reliably over a long period of time without deterioration of the charges, and without great expense, complexity, or maintenance requirements.

In general the invention features a source of charges of gas sensitive material, an optical sensor responsive to the color of the charges, the color being changeable at a rate dependent upon the concentration of the gas being measured, and a recorder for recording the length of time required for each successive charge advanced to the sensor to undergo a predetermined color change. In preferred embodiments the charges are sealed in a narrow strip between two tapes, adhered to one tape; the narrow strip is cut out of the lamination and exposed to a gas sample; a lamp and photocell measure the color change; a bridge circuit compares the color change to a reference and lifts a recording stylus from a circular chart when the change is sufficiently great, so that the length of the mark on the chart is a measure of the gas concentration; continuous and intermittent drives are provided for the stylus and the tape and chart advancement, respectively; a balancing potentiometer automatically tends to balance the bridge prior to each reading; and a pair of sacs provide the gas samples.

Figure 1:
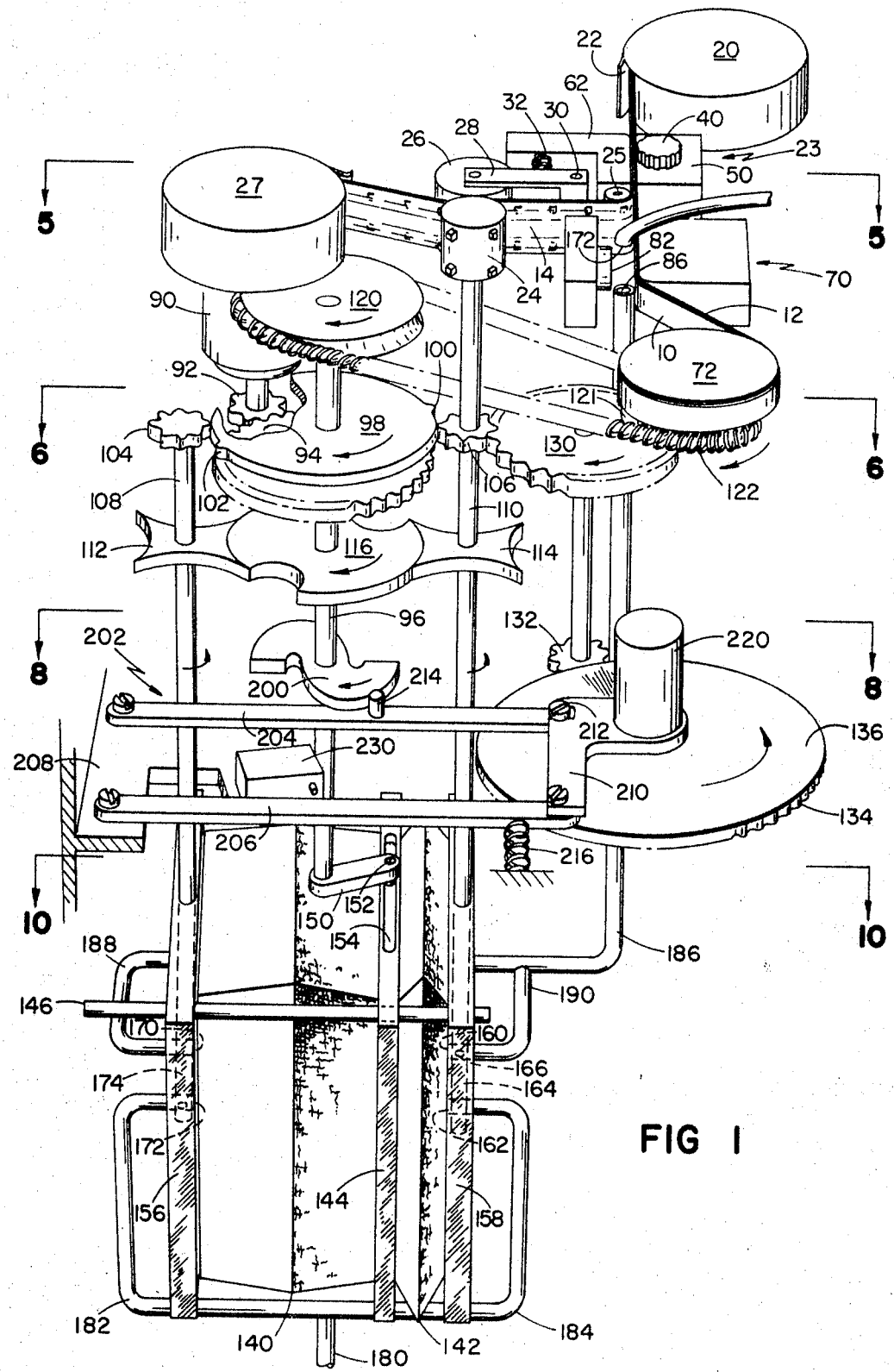
Figure 10:
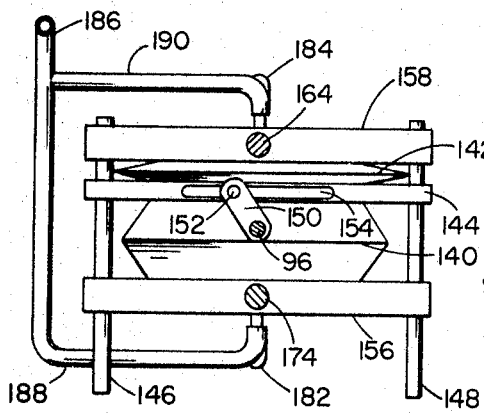
Figure 11:
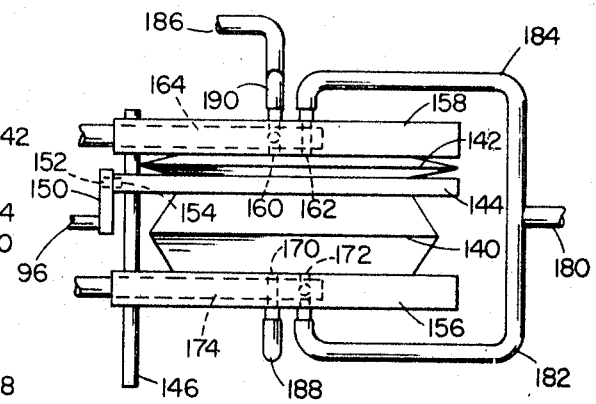
Figure 12:
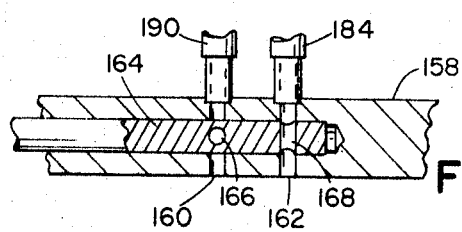
Figure 13:
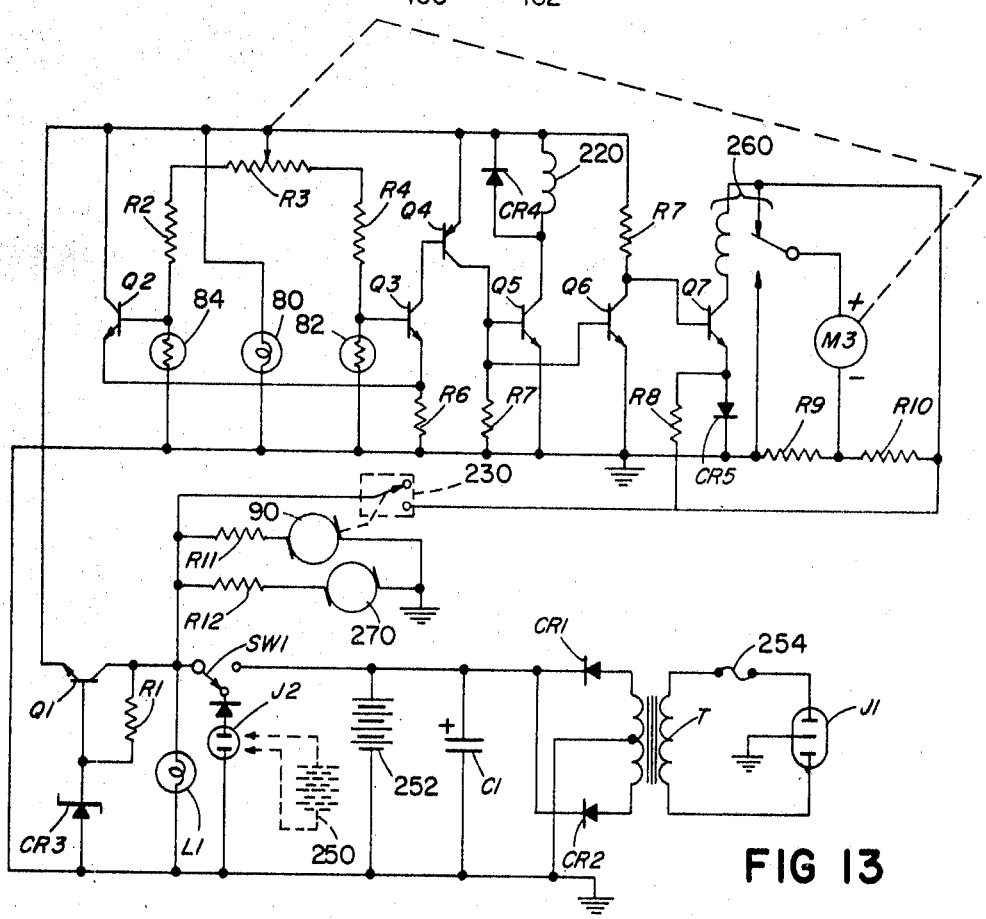

Other objects, features, and advantages of the invention will appear from the following description of a preferred embodiment thereof, taken together with the drawings, in which FIG. 1 is a somewhat schematic view of the gas monitor;
FIGS. 2a and 2b show the laminated tape;
FIGS. 3a and 3b show the lamination cutter;
FIG. 4 shows the sensor;
FIG. 5 is taken along 5—5 of FIG. 1;
FIG. 6 is taken along 6—6 of FIG. 1;
FIG. 7 shows a fragment of the drive;
FIG. 8 is taken along 8—8 of FIG. 1;
FIG. 9 is a fragmentary view showing the recorder and chart;
FIG. 10 is taken along 10—10 of FIG. 1;
FIG. 11 is a side view of the subject of FIG. 10;
FIG. 12 is a section showing a rotor valve; and
FIG. 13 is a circuit diagram.

A finely divided gas sensitive gel 10 is deposited on the tacky side of standard ½ inch wide transparent or translucent pressure sensitive tape 12 (FIGS. 2a, 2b) in a 3/16 inch wide strip, leaving 5/32 inch of tacky surface at each side of the gel. Tape 12 is then stuck to a clear, uncoated 16 mm. film base 14 having sprocket holes 16, providing a continuously sealed strip of gel which can be stored without deterioration.

The embodiment described is used for detection of carbon monoxide, and the gel employed is described in U.S. Patent 3,245,917.

The laminated tape is drawn (FIGS. 1, 5) from slot 22 of storage cassette 20, through drag and cutting assembly 23, and over roller 25 where the gel bearing tape 12 is diverted from tape 14, the latter passing between sprocket wheel 24 and pressure roller 26 mounted in frame 28 biased about pivot 30 by spring 32. Tape 14 is wound in fixed take-up cassette 27 having a free-running sprocket wheel 27a inside. The tape is stiff enough to drive wheel 27a, thereby winding itself up.

In assembly 23 (FIGS. 3a, 3b) an eccentric shaft 40 is mounted with its narrow portion 42 journaled in fixed bracket 44 and its wide portion 46 in bore 48 of movable pressure pad 50. Cutter wheel 52, having rotary blades 54, 56 spaced apart by 3/16 inch, is carried by shaft 40 in pressure pad recess 60. Pressure pad 50 is biased toward fixed anvil 62 by spring 64. The laminated tape passes between pad 50 and anvil 62 with the strip of gel centered between blades 54, 56, and with tape 12 facing wheel 52. Blades 54, 56 are set to cut sufficiently through tape 12 to free its gel bearing central portion from the rest of the lamination. Pressure pad 50 provides a friction drag on the tape and can be moved away from anvil 62 by rotation of shaft 40, for loading the tape.

The cut out portion of tape 12 passes through sensor assembly 70 and onto take-up drum 72 coupled for rotation to shaft 96 by pulleys 120, 121 and spring belt 122.

In assembly 70 (FIG. 4) a lamp 80 (6 volt incandescent miniature) and a sensing photocell 82 are mounted on opposite sides of the path of tape 12, with a standard reference photocell 84 carrying a color filter 85 being mounted above lamp 80. Gas exhaust nozzle 86 is mounted adjacent the tape path to pass gas samples into contact with the gel.

Motor 90 (adjusted to run at 2 r.p.m.) drives gear 94 through pinion 92 having a 1:8 gear ratio to gear 94. Gear 94, and shaft 96 on which it is mounted, are thus driven one revolution every four minutes.

Also carried by shaft 96 is an intermittent gear 98 having single teeth 100, 102 at opposite ends of a diameter.

Eight tooth pinions 104, 106 are mounted respectively on shafts 108, 110 adjacent gear 98. Shafts 108, 110 also respectively carry Geneva sectors 112, 114 for interaction with locking disk 116 carried by shaft 96. Shafts 108, 110 are each thus driven 90 degrees every two minutes, with rotation of these shafts between their incremental advances being prevented by sectors 112, 114 and disk 116.

Sprocket 24 is driven directly by shaft 110. Shaft 96 is coupled to drum 72 through pulleys 120, 121 and spring belt 122, so that constant tension is applied to tape 12, and tape 12 is wound up during the incremental advances of sprocket 24. The diameter of the sprocket is such that it advances the tape by ⅜ inch during each 90 degrees' rotation.

Pinion 106 drives a gear 130 which through attached cluster gear 132 drives large chart gear 134 with an overall reduction of 61.09 to 1, so that circular chart 136 (of pressure sensitive paper) will make one revolution every 488.72 minutes.

Flexible plastic sacs 140, 142 are mounted on opposite sides of plate 144 slidable on posts 146, 148. Crank 150 is connected by roller 152 at one end in slot 154 of plate 144, and is connected at its other end to shaft 96. The opposite ends of sacs 140, 142 are mounted on fixed plates 156, 158.

Plate 158 has a pair of transverse passages 160, 162 (FIG. 12), and a valve rotor 164 having holes 166, 168 with perpendicular axes. Rotation of valve 164 by 90 degrees thus opens one of passages 160, 162 and closes the other.

Similar passages 170, 172 and valve rotor 174 are provided in plate 56.

Valve rotors 164, 174 are respectively driven by shafts 110, 108.

Tube 180 leads from the atmosphere through branch tubes 182, 184 to passages 172, 162, respectively. Tube 186 leads from nozzle 86 through branches 188, 190 to passages 170, 160, respectively.

Two-lobed cam 200 is mounted on shaft 96 and drives bar linkage 202 comprising bars 204 and 206 pivoted to frame 208, and bar 210 pivoted at one end to bar 206 and slotted at its other end to receive screw 212 mounted on bar 204. Cam 200 drives the linkage through pin 214 and bar 204, and spring 216 biases the linkage against the cam. Arm 210 carries solenoid 220, on the core 222 of which is mounted recording stylus 224.

Micro-switch 230 is mounted adjacent arm 206 and is held closed by arm 206 when the arm is in the dotted line position of FIG. 8.

In operation, shaft 96 rotates continuously making one revolution every four minutes. Every two minutes a 90 degree rotation of sprocket 24 advances the tape by ⅜ inch. The central strip of gel bearing tape 12 (carrying only the charge of gel to be used in the next reading) is cut free by wheel 52, separates from the tape 14 at roller 25, and passes into sensor assembly 70 to bring a fresh strip of gel between lamp 80 and photocell 82. Simultaneously, the 90 degree rotations of shafts 108, 110 shift rotor valves 164, 174 so that one of sacs 140, 142 is connected to the atmosphere through tube 180 (this sac previously having been open to the gel through tube 186), and the other sac is closed from the atmosphere and opened to the gel through tube 186. Over the next two minutes shaft 96 moves through a half revolution, rotating crank 150 by 180 degrees and shifting plate 144 to exhaust through tube 186 the contents of the sac newly opened to the gel. Simultaneously, the other sac is expanded and filled from the atmosphere. Thus, a continuous stream of air is passed through nozzle 86 over the newly exposed strip of gel for two minutes. During this two minute period cam 200 moves against pin 214, forcing bar linkage 202 against spring 216 and moving stylus 224 radially inwardly along chart 136. So long as solenoid 220 is not actuated, the stylus will mark a radial line on the chart.

As the air passes over the gel from the nozzle, the presence of carbon monoxide will cause the gel to change color, with the rate of change of color being a function of the concentration of carbon monoxide. When the color of the gel becomes dark enough, as sensed by photocell 82, solenoid 220 (protected by diode CR4 wired in parallel with the coil) will be actuated, lifting stylus 224 from the chart. The length of the line on the chart will thus be a measure of the concentration of carbon monoxide in the two minute air sample. When shaft 96 completes its 180 degree rotation, cam 200 allows spring 216 to return the stylus to the outer circumference of chart 136, and the entire cycle described above is repeated.

The electrical circuitry for controlling the operation just described is shown in FIG. 13. Photocells 82 and 84 are incorporated in a bridge circuit with resistors R2, R4 and potentiometer R3. The bridge output is fed into the differential amplifier formed by transistors Q2, Q3, and resistor R5, whose output is amplified by transistors Q4, Q5 and fed to solenoid 220. The circuit is adjusted initially so that solenoid 220 is not activated. Reference filter 85 matches the light transmission of the gel coated tape 12 before it has been exposed to carbon monoxide, so that any differences in the currents passed by cells 82, 84 is due to gel color change produced by the presence of carbon monoxide in the air sample. Variations due to photocell tolerances and optical path differences are balanced out by adjusting potentiometer R3.

Receptacle J1 accepts an A.C. input line cord. Receptacle J2 allows operation from external twelve volt battery 250. Internal battery 252 is a rechargeable nickel cadmium cell type capable of operating the instrument for 8–10 hours on a full charge. The battery is charged through full wave rectifying circuit comprising transformer T, diodes CR1 and CR2, and capacitor C1. Fuse 254 is provided in the charging circuit. Transistor Q1, Zener diode CR3, and resistor R1 form a voltage regulating circuit. L1 is a pilot lamp. Switch SW1 is provided for switching in either battery.

At the start of each cycle switch 230 is held closed by bar 206, allowing the output of the differential amplifier Q2, Q3 to run motor M3 through intermediate amplifier Q6 and series relay 260 connected to the collector lead of transistor Q7. Resistor R8 and diode CR5 control the bias voltage of transistor Q7. If the bridge circuit indicates imbalance, motor M3 will drive potentiometer R3 toward a balanced condition. Resistors R9, R10 act as voltage dividers so that the reversal of the position of relay 260 will reverse the direction of current to the motor. The motor thus operates in either direction, depending upon the required adjustment of potentiometer R3. When switch 230 opens, R3 will be in the average balance position. At this time, rotation of valves 164, 174 will have proceeded to an extent sufficient to allow discharge of the air sample to the gel (switch 230 being timed to open just before the discharge of gas through nozzle 86).

Power is supplied to motor 90 through resistor R11. Another motor 270 (FIG. 12) is powered through resistor R12 and operates a blower (not shown) which exhausts the housing through opening 272 (FIG. 1) to purge the sensing head 270 so that subsequent air samples are not contaminated by previous samples.

What is claimed is:
1. A device for sensing and recording concentrations of a particular gas in a gaseous sample, comprising:
  a source of a multiplicity of charges of a substance responsive to the presence of said particular gas to change color at a rate dependent upon the concentration of said particular gas.
  an optical sensor responsive to the color of said substance,
  a recording assembly capable of assuming first and second conditions and having a device for registering the time elapsed between the assumption of said first condition and the assumption of said second condition,
  a drive for successively advancing said charges to said sensor and removing therefrom previous charges, said recording assembly being arranged to assume said first condition upon advancement of a fresh charge to said sensor,
  circuitry connecting said sensor and said recording assembly and adjusted to cause said assembly to assume said second condition when said charge at said sensor changes color by a predetermined amount, and
  a source of gaseous samples for contact with successive charges.

2. The device of claim 1 wherein said source of charges is a continuous laminated translucent or transparent tape enclosing said charges in a sealed condition, and a device is provided to separate the laminations of said tape to expose only the charge about to be advanced to said sensor.

3. The device of claim 2 wherein said charge is adhered to the surface of one lamination of said tape.

4. The device of claim 3 wherein said charge is adhered in a strip narrower than said one lamination, and said lamination separating device includes a pair of knives set to cut through said one lamination only to allow removal of the portion of said one lamination carrying said narrow strip.

5. The device of claim 1 wherein said sensor comprises a lamp and a photocell arranged to sense the amount of light from said charge.

6. The device of claim 5 wherein said circuitry includes a reference photocell and a bridge circuit to provide an output reflective of said color change.

7. The device of claim 6 wherein said bridge circuit includes a balancing potentiometer, and a motor is arranged to adjust said potentiometer upon advancement of a charge to said sensor to tend to balance said bridge circuit prior to exposure of said charge to the gaseous sample.

8. The device of claim 7 including a pump for bringing said gaseous sample to said charge, and a switch for automatically effectively disabling said motor upon the pumping of said sample.

9. The device of claim 1 wherein said drive comprises:
a first assembly for continuously driving said recording assembly, and
a second assembly for intermittently advancing said charges.

10. The device of claim 9 wherein said recording assembly includes a recording element and a chart, said first assembly drives said element continuously along said chart, and said recording element effectively makes a record on said chart only when said recording assembly is in said first condition.

11. The device of claim 10 wherein said chart is circular and said recording element moves radially along said chart, said second assembly is additionally connected to intermittently advance said chart upon advancement of a new charge to said sensor.

12. The device of claim 10 wherein said recording element is a stylus, said chart is pressure sensitive, and a solenoid is provided to remove said stylus from contact with said chart upon said color change of said predetermined amount.

13. The device of claim 1 wherein said source of gaseous samples comprises a pair of sacs and apparatus for alternately filling one sac from the atmosphere and discharging the other sac to the charge at said sensor.

14. A device for sensing gas concentrations comprising:
a sensor,
a laminated tape having a multiplicity of charges of gas sensitive material sealed between its laminations and adhered to the surface of one lamination,
a drive for advancing said tape past said sensor, and
a device for separating said laminations to expose only the charge about to be advanced to said sensor.

15. The device of claim 14 wherein said charge is adhered in a strip narrower than said one lamination, and said lamination separating device includes a pair of knives set to cut through said one lamination only to allow removal of the portion of said one lamination carrying said narrow strip.

References Cited
UNITED STATES PATENTS

| | | | |
|---|---|---|---|
| 3,096,137 | 7/1963 | Silard | 346—32 |
| 3,245,917 | 4/1966 | Mayo | 252—408 |
| 3,368,872 | 2/1968 | Natelson | 23—253 |

STEPHEN J. TOMSKY, Primary Examiner

J. W. HARTARY, Assistant Examiner

U.S. Cl. X.R.

23—254; 73—23; 346—124; 356—207